(12) United States Patent
Rousis et al.

(10) Patent No.: US 11,798,104 B2
(45) Date of Patent: Oct. 24, 2023

(54) SYSTEM AND METHODS FOR CONTINUOUS OPTIMIZATION AND REAL-TIME CONTROL OF MULTIPLE ENERGY ASSETS

(71) Applicant: SMART POWER NETWORKS LTD, London (GB)

(72) Inventors: Anastasios Rousis, London (GB); Dimitrios Tzelepis, Glasgow (GB)

(73) Assignee: SMART POWER NETWORKS LTD, London (GB)

( * ) Notice: Subject to any disclaimer, the term of this patent is extended or adjusted under 35 U.S.C. 154(b) by 0 days.

(21) Appl. No.: 18/245,487

(22) PCT Filed: Jun. 29, 2021

(86) PCT No.: PCT/IB2021/055800
§ 371 (c)(1),
(2) Date: Mar. 15, 2023

(87) PCT Pub. No.: WO2022/058803
PCT Pub. Date: Mar. 24, 2022

(65) Prior Publication Data
US 2023/0260058 A1  Aug. 17, 2023

(30) Foreign Application Priority Data

Sep. 21, 2020  (GB) ..................................... 2014887

(51) Int. Cl.
*G06Q 50/06* (2012.01)
*H02J 3/38* (2006.01)
*H02J 3/00* (2006.01)

(52) U.S. Cl.
CPC .............. *G06Q 50/06* (2013.01); *H02J 3/004* (2020.01); *H02J 3/381* (2013.01); *H02J 2203/10* (2020.01); *H02J 2203/20* (2020.01)

(58) Field of Classification Search
CPC  G06Q 50/06; H02J 3/004; H02J 3/381; H02J 2203/10; H02J 2203/20
See application file for complete search history.

(56) References Cited

U.S. PATENT DOCUMENTS 9,300,137 B2 *  3/2016  Cherian .................... H02J 3/16
9,727,828 B2 *  8/2017  Sun .................. G06Q 10/06375
(Continued)

FOREIGN PATENT DOCUMENTS

WO    2012015508 A1    2/2012

OTHER PUBLICATIONS

Basck, Applicant's Response to Examination Report under Section 18(3) PA77 dated Feb. 5, 2021 in respect of Applicant's patent application GB2014887.0, dated Mar. 31, 2021, 14 pages.
(Continued)

*Primary Examiner* — M. N. Von Buhr (57) ABSTRACT

Disclosed is system for continuous optimization and real-time control of multiple energy assets, such as electricity, heat, transport, utilized by plurality of nodes in distributed energy network having different energy sources. The system includes a plurality of control devices and software module. Each control device is associated with an energy asset, and configured to determine and communicate status information of associated energy asset and control settings and set triggers for associated energy asset for regulating utilization thereof by corresponding node. Software module is configured to receive status information from plurality of control devices; construct network topology for distributed energy network based on received status information; collect data for each energy asset; formulate constrained optimization problem based on constructed network topology and collected data; and compute solution to formulated constrained optimization problem to determine one or more of settings, control commands and triggers for associated energy asset,
(Continued)

for plurality of control devices, to provide integration and optimization of multiple energy sources.

12 Claims, 6 Drawing Sheets

(56) References Cited

U.S. PATENT DOCUMENTS

| | | | | |
|---|---|---|---|---|
| 10,063,052 | B2* | 8/2018 | Weckx | H02J 3/06 |
| 10,132,271 | B2* | 11/2018 | Curtis | G06Q 50/06 |
| 10,684,636 | B2* | 6/2020 | Wong | H02J 13/00 |
| 10,991,041 | B2* | 4/2021 | Mokhtari | G06Q 40/04 |
| 2011/0022434 | A1 | 1/2011 | Sun et al. | |
| 2015/0012144 | A1 | 1/2015 | Wang et al. | |
| 2015/0134135 | A1 | 5/2015 | Wong et al. | |
| 2015/0280436 | A1 | 10/2015 | Weckx et al. | |
| 2016/0098794 | A1 | 4/2016 | Mokhtari et al. | |
| 2020/0379494 | A1* | 12/2020 | Wong | G05F 1/66 |

OTHER PUBLICATIONS

European Patent Office, Notification of Transmittal of the International Search Report and the Written Opinion of the International Searching Authority, or the Declaration, International Application No. PCT/IB2021/055800, dated Sep. 28, 2021, 13 pages.

European Patent Office; International Search Report; PCT/IB2021/055800; dated Sep. 28, 2021; 3 pages.

European Patent Office; Written Opinion of the International Search Authority; PCT/IB2021/055800; dated Sep. 28, 2022; 6 pages.

Intellectual Property Office, Combined Search and Examination Report under Sections 17 and 18(3), Application No. GB2014887.0, dated Nov. 2, 2020, 6 pages.

Intellectual Property Office, Examination Report under Section 18(3), Application No. GB2014887.0, 4 pages.

Intellectual Property Office, Notification of Grant, Patent Serial No. GB2592289, for Patent Application No. GB2014887.0, dated Jan. 11, 2022, 2 pages.

* cited by examiner

SYSTEM AND METHODS FOR CONTINUOUS OPTIMIZATION AND REAL-TIME CONTROL OF MULTIPLE ENERGY ASSETS

TECHNICAL FIELD

The present disclosure relates generally to smart energy systems; and more specifically, to systems and methods for continuous optimization and real-time control of multiple energy assets utilized by a plurality of nodes in a distributed energy network having different energy sources.

BACKGROUND

The energy sector is an indispensable part of the modern society. The global energy sector is undergoing an energy transition by shifting from fossil-based centralised systems to renewable-energy-based decentralised systems. The renewable-energy-based decentralised systems are typically based on renewable-energy sources, for example, wind, solar power, tides, thermal, and so forth. Moreover, the renewable-energy-based systems generate energy, distributed across different scales and system levels (namely, voltage levels), that is used to run Internet-of-Things (IoT) assets amongst others. However, such a distributed energy and IoT asset mix, introduces certain limitations such as limited system visibility, controllability and data exploitation.

Advances in energy sector in the last decade have mitigated the challenges related to the visibility, controllability and data exploitation of the energy transition. Some of the traditional energy sources, such as for example solar photovoltaic systems, energy distribution grids that function based on control logics, and integrated energy systems, have successfully been installed for supplying energy to residential and non-residential sites. However, traditional energy sources fail to provide a multi-vector coordinated control of multiple energy assets, interoperability of multiple assets (such as energy assets and logical and physical entities for example an online platform, a control system, and so on), a holistic end-to-end solution (even in the absence of internet), controllability down to the millisecond-level, and an off-grid and on-grid operation support.

Conventional solutions to mitigate the interoperability of multiple energy assets have been provided recently. Such conventional solutions focus on static optimization of the multiple energy assets. However, the static optimization techniques are based on single objective functions at a time and fail to optimize the multiple energy assets as a whole in real-time, while satisfying many objectives at the same time. Moreover, the static optimization techniques accept only a limited type of data, for example only pricing data corresponding to each of the energy assets in order to optimize the multiple energy assets individually. Such approach may not provide efficient utilization of multiple energy assets. Furthermore, the conventional solutions are not flexible enough to accommodate changes in the architecture and operation of the system.

Therefore, in light of the foregoing discussion, there exists a need to overcome the aforementioned drawbacks associated with energy management in optimizing the multiple energy assets as a whole or unified system in real-time while still monitoring and considering the system- and environmental configurations.

SUMMARY

The present disclosure seeks to provide a system for continuous optimization and real-time control of multiple energy assets utilized by a plurality of nodes in a distributed energy network having different energy sources. The present disclosure also seeks to provide a method for continuous optimization and real-time control of multiple energy assets utilized by a plurality of nodes in a distributed energy network having different energy sources. The present disclosure seeks to provide a solution to the existing problem of conventional systems that tend to optimise the system separately for each energy vector. For example, optimisation systems for electricity optimise only the electricity assets, and so on. The present disclosure provides a system that optimizes and controls the multiple energy assets as a complete unified system in real-time. An aim of the present disclosure is to provide a solution that overcomes at least partially the problems encountered in prior art, and provides an efficient and robust system and method for real-time control and supervision of multiple energy assets as a unified system in an extremely eco-friendly manner. In this regard, the system is capable of monitoring the system as well as environmental changes and optimize the system based on multiple objective functions simultaneously based on a plurality of inputs.

In one aspect, an embodiment of the present disclosure provides a system for continuous optimization and real-time control of multiple energy assets utilized by a plurality of nodes in a distributed energy network having different energy sources, wherein the multiple energy assets comprise electric power, heat and transport, the system comprising:
 a single centralised control unit associated with a plurality of control devices, with each of the plurality of control devices associated with one of the multiple energy assets in one of the plurality of nodes, wherein the single centralised control unit in coordination with the plurality of control devices, is configured to determine and communicate a status information of the associated energy asset in the corresponding node, and to control settings and set triggers for the associated energy asset for regulating utilization thereof by the corresponding node; and
 a software module configured to:
  receive status information, from the plurality of control devices, for each of the multiple energy assets for each of the nodes via and the plurality of control devices;
  construct a network topology for the distributed energy network providing correlation between the multiple energy assets based on the received status information;
  collect data, including forecast information, for each of the multiple energy assets in the distributed energy network;
  formulate a constrained optimization problem based on the constructed network topology and the collected data;
  compute a solution to the formulated constrained optimization problem to determine one or more of settings, control commands and triggers for the associated energy asset, for the plurality of control devices, in the corresponding node to provide integration and optimization of the multiple energy sources in the distributed energy network; and
  determine unified control loops, indicative of real-time, dynamic operating characteristics of the distributed energy network for the multiple energy assets, to be executed by the single centralised control unit and the plurality of control devices therein.

In another aspect, an embodiment of the present disclosure provides a method for continuous optimization and real-time control of multiple energy assets utilized by a plurality of nodes in a distributed energy network having different energy sources, wherein the multiple energy assets comprise electric power, heat and transport, the method comprising:

determining a status information for each of the multiple energy assets for each of the nodes; and constructing a network topology for the distributed energy network providing correlation between the multiple energy assets based on the received status information;

collecting data, including forecast information, for each of the multiple energy assets in the distributed energy network;

formulating a constrained optimization problem based on the constructed network topology and the collected data;

computing a solution to the formulated constrained optimization problem to determine one or more of settings, control commands and triggers for the associated energy asset, for the plurality of control devices, in the corresponding node to provide integration and optimization of the multiple energy sources and the multiple energy assets in the distributed energy network;

controlling settings and setting triggers, based on the computed solution, for the multiple energy assets; and determining unified control loops, indicative of real-time, dynamic operating characteristics of the distributed energy network for the multiple energy assets, to be executed by the single centralised control unit and the plurality of control devices therein.

Embodiments of the present disclosure substantially eliminate or at least partially address the aforementioned problems in the prior art, and enable real-time supervision, optimization and control of multiple energy assets, accounting for three energy vectors, i.e. electricity, heat and transport, simultaneously as a unified system in a coordinated manner across a smart energy network.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for continuous optimization and real-time control of multiple energy assets utilized by a plurality of nodes in a distributed energy network having different energy sources, wherein the multiple energy assets comprise electric power, heat and transport, the system comprising:

a single centralised control unit associated with a plurality of control devices, with each of the plurality of control devices associated with one of the multiple energy assets in one of the plurality of nodes, wherein the single centralised control unit in coordination with the plurality of control devices, is configured to determine and communicate a status information of the associated energy asset in the corresponding node, and to control settings and set triggers for the associated energy asset for regulating utilization thereof by the corresponding node; and a software module configured to:

receive status information, from the plurality of control devices, for each of the multiple energy assets for each of the nodes via the plurality of control devices;

construct a network topology for the distributed energy network providing correlation between the multiple energy assets based on the received status information;

collect data, including forecast information, for each of the multiple energy assets in the distributed energy network;

formulate a constrained optimization problem based on the constructed network topology and the collected data;

compute a solution to the formulated constrained optimization problem to determine one or more of settings, control commands and triggers for the associated energy asset, for the plurality of control devices, in the corresponding node to provide integration and optimization of the multiple energy sources and the multiple energy assets in the distributed energy network; and determine unified control loops, indicative of real-time, dynamic operating characteristics of the distributed energy network for the multiple energy assets, to be executed by the single centralised control unit and the plurality of control devices therein.

In another aspect, an embodiment of the present disclosure provides a method for continuous optimization and real-time control of multiple energy assets utilized by a plurality of nodes in a distributed energy network having different energy sources, wherein the multiple energy assets comprise electric power, heat and transport, the method comprising:

determining a status information for each of the multiple energy assets for each of the nodes; and constructing a network topology for the distributed energy network providing correlation between the multiple energy assets based on the received status information;

collecting data, including forecast information, for each of the multiple energy assets in the distributed energy network;

formulating a constrained optimization problem based on the constructed network topology and the collected data;

computing a solution to the formulated constrained optimization problem to determine one or more of settings, control commands and triggers for the associated energy asset, for the plurality of control devices, in the corresponding node to provide integration and optimization of the multiple energy sources and the multiple energy assets in the distributed energy network;

controlling settings and setting triggers, based on the computed solution, for the multiple energy assets; and determining unified control loops, indicative of real-time, dynamic operating characteristics of the distributed energy network for the multiple energy assets, to be executed by the single centralised control unit and the plurality of control devices therein.

The present disclosure provides the system and method for energy systems, real-time optimisation and dynamic control. The system of the present disclosure comprises a hardware module and a software module for data processing, communication and control functionalities in multi-energy asset (power, heat and transport) networks as a unified system in a coordinated manner. Beneficially, the system mitigates the limitations of the conventional energy management systems and provides an end-to-end solution for an efficient and effective energy management in real-time. In this regard, the system increases the visibility over the network down to the resource level (e.g. batteries, heat pumps, etc.) and takes optimal dispatch decisions leveraging its unique layered approach. The layered approach enables coordinated and optimal control actions to ensure real-time energy management achieving highest integration of renewable sources and resolving network issues (e.g. network congestion, frequency and voltage stability, and the like). Moreover, with the present system optimizing the use of renewable energy sources results in reduced carbon dioxide ($CO_2$) emissions, flexible use of energy and reduced energy bills. Furthermore, the system of the present disclosure enables increased utilization of assets apart from vendor-specified asset utilization even during reduced network reinforcements. Additionally, the system of the present disclosure provides enhanced system resilience and security of supply and access to new revenue streams. The system of the present disclosure increases visibility over the distributed energy network down to the resource level (e.g. batteries, heat pumps, and so on) and takes optimal dispatch decisions.

The software module of the disclosed system is strategically-orchestrated with a powerful CPU-based programmable controller with an FPGA to optimize and control multiple energy assets in real-time coordinated dynamics. Throughout the present disclosure, the term "strategically-orchestrated" as used herein refers, that for the realisation and real-time execution of the processes, depending on the criticality, the software module is configured to share data and allocate tasks between hardware elements, i.e. powerful multi-core processors (CPU), FPGA-based backbones, and distributed input-output devices and microcontrollers outside the SNC, such as subsystems. Moreover, the system provides engaging graphical user interface for easier access and data exchange with any physical or IoT asset, thereby, unlocking interoperability in energy systems. Furthermore, the system is flexible and scalable to accommodate changes in the system architecture and operation. Beneficially, the system can operate in on-grid mode exchanging energy with wider networks but also autonomously (i.e. off-grid) serving the needs of an isolated part of a network. Additional benefits arise from the fact that since the system is strategically placed in the network with monitoring devices connected to it, it essentially serves as a data harvesting and analysing device. Such data is utilized not only for the control actions as described, but can also be used for extracting insights and maximising value through novel data-driven business models. Therefore, by appropriately utilizing the data, significant value can be created for energy stakeholders by creating novel data-driven business models.

Throughout the present disclosure, the term "system" as used herein refers to a smart energy system for enhancing energy efficiency to meet the increasing need of energy across globe. Specifically, the system includes hardware (referred to as "single centralised control unit" and "plurality of control devices" hereafter) and associated software (referred to as "software module" hereafter) components. The system is configured with data processing, communication and dynamic control functionalities. Specifically, the system is strategically placed in the distributed energy network. Moreover, the system is connected with monitoring devices that serves as data harvesting and analysing device(s). In some embodiments, such data are utilized for continuous optimization and real-time control of multiple energy assets in a unified and coordinated manner to be utilized by plurality of nodes in a distributed energy network. Additionally, in some embodiments such data are utilized for extracting insights and maximising value through novel data-driven business models.

The term "distributed energy network" as used herein refers to an all-in-one solution for energy production, conversion, storage and consumption. Specifically, the distributed energy network provides an integrated framework of integrated energy sources, energy conversion systems (such as generators, for example thermal power plants, or inverters), energy storage systems (such as batteries), and consumer technologies (such as IOT devices (for example HVAC systems, electric water heaters, meters) or electric vehicles). The distributed energy network typically employs renewable resources to harness energy and supply thereof across a predefined area (such as throughout a country). It will be appreciated that the energy storage systems are an important part of the distributed energy network as they store the excess generated energy to ensure energy reliability. The distributed energy networks have capacities typically ranging between a few kilowatts (kW) and a few megawatts (MW), such as for example 1 kW up to 10 MW. Optionally, the distributed energy network is located close to the end-user site, hence also referred to as "on-site generation" network. Beneficially, such arrangement of the distributed energy network close to the end-user site ensures efficient transportation of energy and preventing a potential loss of energy during long-distance transportation thereof. Additionally, beneficially, the distributed energy network is a decentralized arrangement which ensures easy repair of a faulty component or part of the system, without disrupting the entire system. Additionally, beneficially, the distributed energy networks are reliable and have a positive environmental impact due to the use of sustainable energy solutions.

The term "node" as used herein refers to a point in a distributed energy network providing and/or utilizing the energy therein. The node may be located at any point in the distributed energy network (e.g., mid-way or at the end), and may provide/utilize energy temporarily or permanently therein without any limitations. Optionally, the nodes connect the various energy sources and the technologies utilizing the energy supplied by the energy sources. In an example, a node may be a thermal power plant that converts fossil fuels into electricity for self-utilization and transmission of electricity over long distances to reach the consumers. In an example, a node may be a building utilizing provided energy in the distributed energy network.

The term "energy assets" as used herein refers to different vectors of energy utilization in the distributed energy network. Herein, the energy assets comprise, but not limited to, electric power, transport and heat. In the embodiments of the present disclosure, beneficially, the integration of multiple energy assets i.e. combining electricity with heating and cooling and transportation, such as in the distributed energy network as disclosed in the present disclosure, result in most effective and cost-effective solutions for the consumers and operators dependent on such systems. For instance, in an example, electric power to heat (gas or liquid conversion), combined with heat saving, results in a flexible, smart energy system that is both an energy efficient and cost-effective sustainable energy solution.

The term "energy sources" as used herein refers to different sources of energy. Optionally, the different energy sources are renewable sources of energy. Herein, the energy sources may be used to produce one or more types of energy assets, using specialized system, such as energy conversion systems, as discussed above. In one or more examples, the energy sources comprise electric power, geothermal power (or heat), wind power, solar power, hydro power, biogas, natural gas, biofuel, and the like. Beneficially, the system offers an integrated, energy-efficient, flexible, and a 100% renewable energy-based system.

The system comprises a single centralised control unit associated with a plurality of control devices. Herein, each of the plurality of control devices is associated with one of the multiple energy assets in one of the plurality of nodes. Furthermore, the single centralised control unit in coordination with each of the plurality of control devices is configured to determine and communicate a status information of the associated energy asset in the corresponding node, and to control settings, control commands and set triggers for the associated energy asset for regulating utilization thereof by the corresponding node. The control device may include suitable sensors for determining the status information, such as voltage, amperage, etc. which are well known in the art and beyond the scope of discussion of the present disclosure. Further, the control device may include communication means, such as, but not limited to, WIFI antenna, for communication the status information to the single centralised control unit and/or a central repository, such as a central server using a communication network as may be contemplated by a person skilled in the art and thus not discussed herein. The control device may further include means for control settings, control commands and set triggers, such as, but not limited to, circuit breakers, relays, etc. It may be appreciated that, herein, the status information is an input data such as energy measurement data, energy generation and consumption profiles, pricing, and so on.

The term "single centralised control unit" as used herein refers to a device that is operable to receive, process and respond to information from each of the plurality of control device wherein the information corresponds to the energy asset. Optionally, the single centralised control unit may be a microprocessor, a microcontroller, a complex instruction set computing (CISC) microprocessor, a reduced instruction set (RISC) microprocessor, a very long instruction word (VLIW) microprocessor, a field programmable gate array (FPGA) unit and so on.

The term "control device" as used herein refers to a device that is operable to receive, process and respond to status information corresponding to the energy asset. Optionally, the control device may store the status information and provide a response instruction corresponding to the status information associated with a corresponding energy asset in a node. It will be appreciated that each of the plurality of control devices may store the correspondingly received status information and provide a dynamically determined response instruction corresponding to the status information associated with each of the multiple energy assets in one of the plurality of nodes. As discussed, the control device is configured to determine the status information and communicate with other subsystems to control settings of the system and set triggers for the associated energy asset for regulating utilization thereof by the corresponding node. Optionally, the status information and commands based thereon are communicated to other systems, such as neighbouring devices or a central server. Optionally, the neighbouring device is a monitoring device, a measurement device or meter, a sensor (such as a voltage sensor, a temperature sensor, a current sensor, and the like), an IOT device, or a central server. The control device is operable to respond to requests, triggers, measurements, and so on. Optionally, the control device may be a microprocessor, a microcontroller, a complex instruction set computing (CISC) microprocessor, a reduced instruction set (RISC) microprocessor, a very long instruction word (VLIW) microprocessor, or any other type of controlling circuit.

The term "status information" as used herein refers to a set (or subset) of signals (static or dynamically-changing) relating to the variables, properties and situational awareness of a physical or virtual entity effectively being an observable change (either intended or unintended) in the system. This could include a price signal, a measurement, commands and triggers from other systems and sub-systems, etc.

In an example, if an energy asset in a node registers a status information as limited power generation, the control device associated with said energy asset in said node switches a similar energy asset in another node to generate energy. In the similar example, as stated above, if an energy asset in a node registers a status information as limited power generation, the control device associated with said energy asset in said node reverses the energy flow and receives energy from an energy storage system not using the stored energy to balance the energy feed in the system, preferably the corresponding energy asset in said node.

Optionally, the plurality of control devices are secured for access by authorized users only. Optionally, the control device is configured to communicate with neighbouring devices for receiving commands as well as sending commands for an action thereof. Optionally, the neighbouring devices are connected to one or more components of the system. In this regard, the plurality of control devices may be accessed by the authorized users for establishing a communication thereof with the neighbouring devices.

The term "software module" as used herein refers to a software program comprising executable instructions to perform one or more distinctive operations, such as receiving user input (for example, status information, commands, or so on), constructing network topology, collecting data, optimization and operating the associated hardware component. The software module may be stored as an instruction (algorithm) on a computer-readable medium in the system, such as in single centralised control unit, plurality of control devices, central server, or neighbouring device, and executed by said single centralised control unit, plurality of control devices, central server, or neighbouring device. Optionally, the software module is a set of one or more software applications. However, each software application serves a unique and separate operation, as mentioned above. Specifically, the software module embedded within the system performs supervisory monitoring, dynamic control, protection, data analysis and optimisation of multiple energy assets installed in distributed energy networks in a coordinated and unified manner. More specifically, the software module determines the information and commands to be sent across the distribution energy network. Such information and commands are utilized by sub-components of the distribution energy network to initiate the control actions associated with each of the sub-components of the distribution energy network to provide the desired energy and power profile. Beneficially, such coordinated and optimal control actions ensure real-time energy control, achieving highest integration of renewable energy sources and resolving network issues (e.g. network congestion, frequency and voltage stability, and so on) due to the increased visibility over the network system. The software module may be pre-installed on a system or can be downloaded from a client network, a remote data storage, or internet. The software module may be a System, Applications and Products (SAP) module, an enterprise resource planning (ERP) software, and so on.

Optionally, the software module is implemented in a central server and/or the single centralised control unit, wherein the central server and/or the single centralised control unit being a Field Programmable Gate Array (FPGA) based control device and/or a Central Processing Unit (CPU). More optionally, the software module performs monitoring, controlling, data protection, data analysis, and command generation in the central server. More optionally, the central server is a cloud-based implementation of the software module. Optionally, the software module determines the information and commands to be sent across the distribution energy network. Herein, the single centralised control unit and the plurality of control devices may utilize the information and commands to optimize the multiple energy assets utilized by the plurality of nodes in the distributed energy network. The plurality of control devices are configurable devices and can be programmed based on the information and commands received from the user.

In some embodiments, each of the plurality of control devices is a Field Programmable Gate Array (FPGA) based control device and/or a Central Processing Unit (CPU). The Field Programmable Gate Array (FPGA) based control device typically employ an array of programmable logic gates configurable to perform complex logic functions. The software module in the central server and/or the single centralised control unit interacts with the FPGA-based control device to communicate information and commands to the FPGA-based control device, and operate the FPGA-based control device to optimize multiple energy assets based on the received information and commands.

The software module communicates information and commands to the one or more plurality of control devices via the single centralised control unit. The received information and commands are used to program the one or more of the plurality of control devices to optimize multiple energy assets based thereon.

The software module is configured to receive status information, from the plurality of control devices, for each of the multiple energy assets for each of the nodes via the plurality of control devices. Optionally, the software module is configured to receive status information from energy platforms associated with the distributed energy network. Optionally, the software module is further configured to exchange status information related to the multiple energy assets to energy platforms associated with the distributed energy network. Optionally, the energy platforms comprise one or more of energy operator's platform, energy trading platform and energy exchange platform. In an example, the status information is typically provided by a user of the system (such as for example a Distribution Network Officer (DNO)), a central server, the distributed energy network, neighbouring devices, and the like. Specifically, the status information provides real-time information about the whole or part of the distributed energy network as well as the energy platforms associated therewith. In an example, the status information provides the information on the connected and disconnected energy platforms utilized by the plurality of nodes in the distributed energy network. In another example, the status information provides the availability and capacities of multiple energy assets utilized by a plurality of nodes in the distributed energy network.

The software module is configured to construct a network topology for the distributed energy network providing correlation between the multiple energy assets based on the received status information. The network topology is a model of the distributed energy network depicting the interconnectedness of various subcomponents of the distributed energy network. Specifically, the network topology utilizes the received status information to depict correlations between the multiple energy assets utilized by the plurality of nodes in the distributed energy network. The "network topology" may also be referred as "network model".

The software module is configured to collect data, including forecast information, for each of the multiple energy assets in the distributed energy network. The collected data may be received as a user input, a sensor reading, a monitoring device reading, a database information from the central server. Optionally, the collected data comprises one or more of weather information, information about limitations of the distributed energy network, information about limitations of energy provider, historical information about generation and consumption of each of the energy asset by each of the node, historical pricing information. It will be appreciated that the data collection by the software module is performed in real-time or near real-time. Optionally, the collected data is saved in the system database, central server or any remote server for future use. Optionally, the software module comprises organizing the collected data and concentrating them in the correct format, timeframes and resolution.

The software module is configured to formulate a constrained optimization problem based on the constructed network topology and the collected data. The software module formulates the constraint optimization problem in the form of an algorithm associated with all the multiple energy assets. Optionally, the multiple energy assets are coupled together in a unified energy system via advanced correlation expressions of the algorithm. Moreover, a unified energy system may typically receive similar or varying contributions from each of the multiple energy assets.

Optionally, the software module is further configured to determine a set of functions indicative of contribution of each variable related to the multiple energy assets in the constrained optimization problem. More optionally, the set of functions are objective functions based on which the constrained optimization problem is formulated. Moreover, the formulated constrained optimization problems require minimizing or maximizing a function or a set of functions subject to certain constraints. In one or more examples, the constraints may be capacity of energy sources, availability of energy sources, up-time of energy sources and the like.

The software module is configured to compute a solution to the formulated constrained optimization problem to determine one or more of settings, control commands and triggers for the associated energy asset, for the plurality of control devices, in the corresponding node to provide integration and optimization of the multiple energy sources in the distributed energy network. Optionally, the one or more of settings and triggers indicate the contributions of each of the multiple energy assets and plurality of control devices in the corresponding node in the distributed energy network. Optionally, the determined settings and triggers provide integration of the electric power, heat and transport in the distributed energy network. Optionally, the one or more of settings and triggers are either static or dynamic functions emanating from a real-time energy trading platform. Specifically, the determined settings and triggers considers a unified energy system comprising contributions from each of the multiple energy assets and plurality of control devices in the corresponding node in the distributed energy network. Optionally, the one or more of settings and triggers are at least one of: an energy service contract, grid code requirements, load shifting, a request for a scheduled energy provision, forecasting, triggers, and so on. It will be appreciated that a solution to the formulated constrained optimization problem is to minimize or maximize the one or more of settings and triggers subject to certain constraints.

Optionally, the software module is further configured to: monitor changes in the network topology; and re-formulate the constrained optimization problem based on changes in the network topology, and the multiple energy assets (e.g. settings, triggers and the like). The changes in the network topology and the multiple energy assets and re-formulation of the constrained optimization problem based thereon is done in real-time or near real-time. It will be appreciated that the status information is generated by the system and data collected in real-time to be utilized for re-formulating the constrained optimization problem based on changes in the network topology. Optionally, the software module provides a framework to monitor any change to the network and the assets with respect to changes in network topology, for example, in an event of connection or disconnection of any component therein, changes to the control settings of the assets, and so forth. Consequently, a change in the network topology initiates the re-formulation of the constrained optimization problem. Beneficially, the re-formulation of the constrained optimization problem contributes to the extensive and adaptive optimization of the unified energy system, as a whole.

The software module is configured to determine unified control loops, indicative of real-time, dynamic operating characteristics of the distributed energy network, for the multiple energy assets, to be executed by the single centralised control unit and the plurality of control devices therein. Optionally, the unified control loops are created in the form of algorithms. More optionally, the unified control loops include fundamental building blocks consisting of all the physical components and control functions necessary to automatically adjust the value of the measured process variables to equal the value of desired set-points. Optionally, the set-points include turning ON or OFF of the system, active or reactive power set-points, voltage set-points, energy and so forth. Furthermore optionally, the unified control loops include corresponding settings (i.e. gains, time constants, droop characteristics, and so forth) and functions to implement smooth control mode transition and error handling. The software module is configured to load the unified control loops and associated control settings to the corresponding plurality of control devices, either locally or remotely. Subsequently, the loops are initiated by the plurality of control devices by collecting real-time measurement data and producing the corresponding control action for the multiple energy assets. In the present examples, the data from the constrained optimization problem formulation as well as the solution computation are stored to a database.

Beneficially, the unified control loops are constructed automatically and loaded to the single centralised control unit in real-time, which in turn instruct the plurality of control devices in real-time. Further, a desired mode is set for the unified control loops (e.g. voltage support in conjunction with reactive power flows), subsequently, the assets to participate in the desired mode are selected alongside their available unique characteristics (e.g. rates, network impedance, etc), and a point of interest is defined in the network. Beneficially, the unified control loops capture all dynamic features of participating assets in conjunction with the desired characteristic at a specific point of a network. It will be appreciated that the unified control loops include but are not limited to common trajectories of active and reactive currents, control loops with PIs, PIDs, gains, limiters, switches, etc., look-up tables, adaptive loci for voltage and frequency control, and so forth.

Optionally, the system architecture follows a unique layered approach, wherein each layer is associated with different hardware, functions and timeframes. Optionally, each layer is independent of the other layers. However, information can be exchanged between the layers for a better performance of the system, thereby allowing all or a part of the layers to be utilized depending on the requirements of each application. The layers include a resource management layer, a power conversion layer, a metering layer, a protection and automation layer, and an integration and operation layer.

Optionally, the resource management layer is configured to monitor the energy sources and other components of the distributed energy network prior to any energy conversion and delivery to the main energy system such as grid. Moreover, the resource management layer is configured to display and analyse data corresponding to multiple energy assets metrics for example state of charge for batteries, irradiation for solar panels, and so forth. Furthermore, the resource management layer is configured to display and analyse data from relevant weather stations (either via hardware or software).

Optionally, the power conversion layer provides real-time control and supervision of the energy generation units, supporting equipment and loads. The power conversion layer is further operable to control mode selection, provide set-points for voltage, active/reactive power, temperature, and so on, monitor and analyse droops and dynamic functions for voltage, frequency and other ancillary support services, and monitor connection and disconnection of energy generation units and loads.

Optionally, the metering layer provides the real-time monitoring and control of metering equipment such as power meters, smart meters, and the like. Moreover, the metering layer is operable to monitor voltage, power, frequency, and so on, calculate power quality indicators (for example harmonic distortion, and the like), and capture potential disturbance using preconfigured triggers.

Optionally, the protection and automation layer provides the real-time monitoring and control of automation and protection equipment, such as power meters, circuit breakers, switches, and so forth. The protection and automation layer is operable to monitor connection and disconnection of circuit breakers and switches, capture potential disturbance using preconfigured triggers, and implement protection and automation functions.

Optionally, the integration and operation layer conducts optimised operation of the unified energy system and realisation of the services and control characteristics at the points of connection. More optionally, the integration and operation layer provides a high-level optimization for energy resources. In this regard, the integration and operation layer is operable to forecast, schedule systems for real-time data collection and status information generation, exchange data with other energy platforms (such as energy system operators, energy trading platforms), monitor and control the unified energy system as a whole, data analysis, and access database for playback and post-processing of captured events.

In an exemplary implementation, the distributed energy network may comprise wind-turbines, roof-top solar photovoltaic panels, a dam built on a river, natural gas turbines, microturbines, biomass generators, and the like, to generate energy. The generated energy is subsequently stored in energy storage systems, such as for example home batteries or inverters, or electric vehicle chargers. In the present exemplary implementation, distributed energy network supports two-way power flow, thereby allowing users to contribute to the balance of the grid and power reliability, particularly during peak periods.

In another exemplary implementation, the system may be installed at a substation of a distributed energy network for supervising, optimising and controlling the multiple energy assets connected to it. Specifically, the system is installed at the control cabinet within the substation. The system is configured to receive inputs or commands by a user, such as a Distribution Network Operator (DNO). The user input or commands are used by the system to optimise the energy exchange of the multiple energy assets subject to certain services and control functions to be realised (e.g. local voltage control). Beneficially, said installation results in reduced network losses (associated with reductions in OPEX), reduced network reinforcements (associated with reductions in CAPEX), increased flexibility exchanges for voltage and frequency stability and so on.

In yet another exemplary implementation, the system may be installed at a local energy network, for example a campus, an energy community village, or the like. The system is configured to supervise, optimise and control the subcomponents of the distributed energy network such as for example solar power, battery storage, EV charging station, and so on. In such installation, the system facilitates reduced energy bills, increased resilience and security of supply (especially in the absence of a main energy supply), and access to new revenue streams by enabling the distributed energy assets to participate in remunerated energy services, and exchanging energy on a peer-to-peer basis. Optionally, the system is installed at the most 'convenient' place, subject to physical security, easiness of maintenance and access to smart infrastructure (i.e. communication, sensors, and the like). In an example, the system is installed at the place where other infrastructure such as cables, routers, servers and so on is installed.

It will be appreciated that the system of the present invention co-optimises and simultaneously controls the multiple energy assets wherein multiple energy assets comprise electric power, heat and transport (belonging to different energy vectors). Beneficially, co-optimisation and simultaneous control of multiple energy assets is implemented in a 'coupled' way. Beneficially, the multiple energy assets are controlled in such a manner that control of one type of asset improves efficiency in other type of asset. Such as, control of a heat asset improves power flow in an electric cable. Beneficially, different physics have been merged such as amalgamation of electricity flows, energy flows, heat levels, gas (liquid-or-non liquid) flows, travel patterns (for EVs), and so forth.

In an example, said approach can apply to the optimisation and control of a building, coupling electricity and heat vectors, as explained hereafter. Modelling of the heating of the building is captured in the algorithms, allowing to face the building as a 'thermal battery' for interaction with the electricity network when needed. In an instance, when the grid (connected to the building) is under-utilised, it may be utilised to 'charge' the heating element of the building, i.e., to operate the heating system towards increasing internal temperature that can last for many hours ahead. In this way, stress of the network in future hours, when the network will be stressed due to increased utilisation of other units is optimized. For instance, demand profiles in residential buildings are in the low side between 1-4 pm when people are at work, while 5-7 pm is a peak time since everyone is back from work doing their house chores. Subsequently, based on the demand profile, the system would beneficially optimize the use of energy between the multiple energy assets.

In another example, a smart control of a gas-powered asset assisted to the voltage management of a DNO substation is described. There is a local energy network (comprising of controllable electricity, heat and transport assets) connected to a DNO's substation via an electric cable. In times of congested energy flows the cable will be subject to abnormal active/reactive power flows leading to over and under voltages (these conditions can be either detected in real-time as well as predicted using the forecasting tools). Traditionally, power systems' conventional control systems would initiate commands to either shed electric loads or generate power using stress generators to exchange power in a very inefficient way, which lead to higher network losses and compromised security of supply.

In contradistinction, the proposed system for the multiple energy assets (controlling electricity, heat and transport assets) would be able to see and predict such event, and would initiate smart real-time adjustment of the loading of heat-pumps, initiate alternative flows of a gas-powered asset to adjust the temperature-related comfort levels and therefore 'relax' the energy flows within the electric cable which eliminates the voltage-related issues. It will be appreciated that in this example application, several techno-economical characteristics are taken into account including but not limited to, ramp rates, capacity, electricity and temperature constraints, availability and pricing, and so forth.

The present disclosure also relates to the method for continuous optimization and real-time control of multiple energy assets utilized by a plurality of nodes in a distributed energy network having different energy sources as described above. Various embodiments and variants disclosed above apply mutatis mutandis to the present method without departing from the scope and the spirit of the present disclosure.

Optionally, the method further comprises:
monitoring changes in the network topology; and
re-formulating the constrained optimization problem based on changes in the network topology.

Optionally, the method further comprises determining a set of functions indicative of contribution of each variable related to the multiple energy assets in the constrained optimization problem.

Optionally, the collected data comprise one or more of weather information, information about limitations of the distributed energy network, information about limitations of energy provider, historical information about generation and consumption of each of the energy asset by each of the node, historical pricing information.

Optionally, the method further comprises exchanging status information related to the multiple energy assets to energy platforms associated with the distributed energy network, and wherein the energy platforms comprise one or more of energy operator's platform, energy trading platform and energy exchange platform.

DETAILED DESCRIPTION OF THE DRAWINGS

Figure 1:
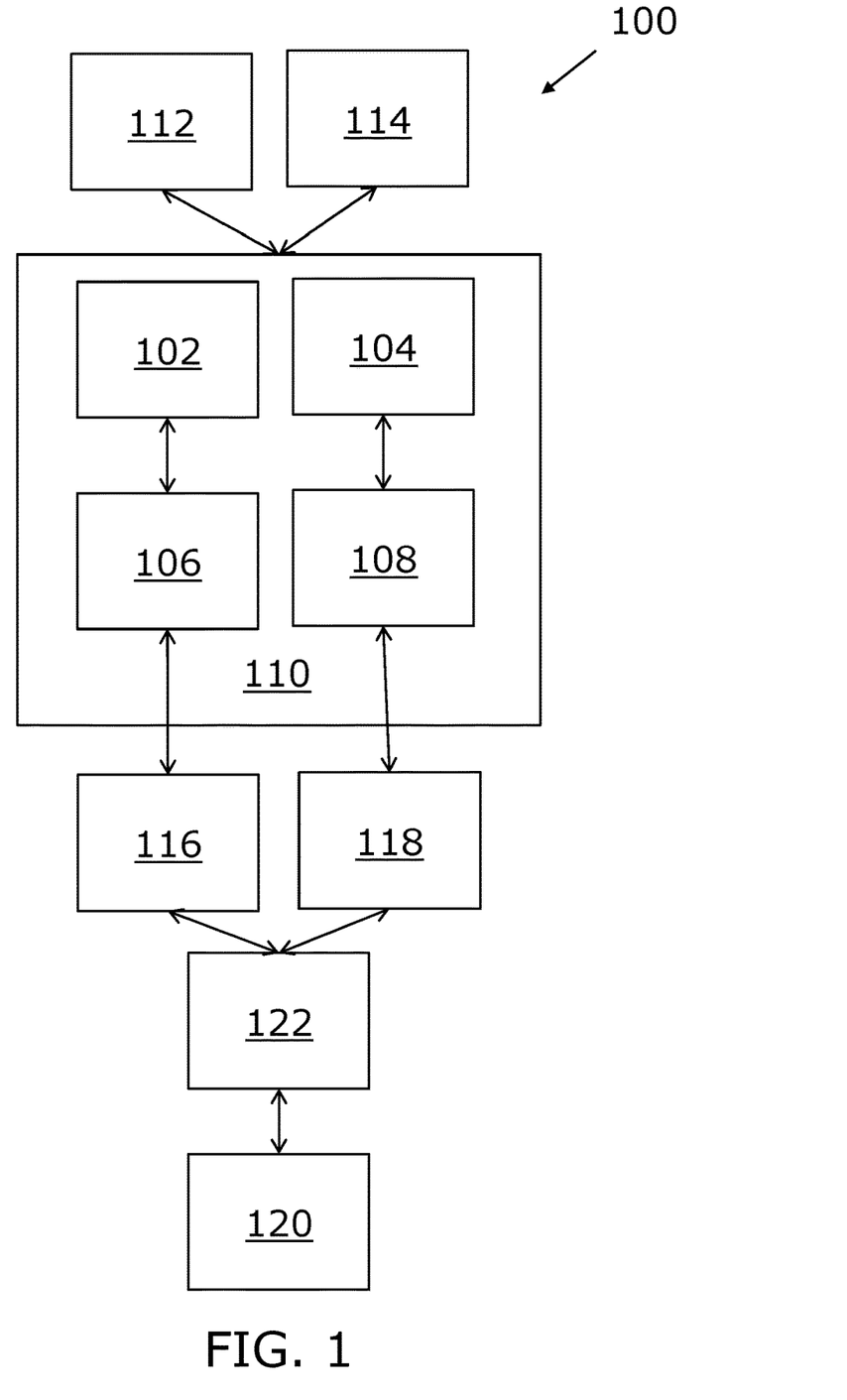
FIG. 1 is a schematic illustration of a system for continuous optimization and real-time control of multiple energy assets utilized by a plurality of nodes in a distributed energy network having different energy sources.

Referring to FIG. 1, illustrated is a schematic illustration of a system 100 for optimizing multiple energy assets, such as energy assets 102, 104, utilized by a plurality of nodes, such as nodes 106, 108, in a distributed energy network 110 having different energy sources, such as energy sources 112, 114, in accordance with an embodiment of the present disclosure. It may be appreciated that the energy sources 112, 114, herein, are part of energy assets 102, 104. The system 100 comprises a single centralised control unit 122 associated with a plurality of control devices, such as control devices 116, 118, with each of the plurality of control devices, such as control devices 116, 118, associated with one of the multiple energy assets, such as energy assets 102, 104, in one of the plurality of nodes, such as nodes 106, 108. A single centralised control unit 122 in coordination with each of the plurality of control devices, such as control devices 116, 118, is configured to determine and communicate a status information of the associated energy asset, such as energy assets 102, 104, in the corresponding node, such as nodes 106, 108, and to control settings and set triggers for the associated energy asset, such as energy assets 102, 104, for regulating utilization thereof by the corresponding node, such as nodes 106, 108. Moreover, the system 100 comprises a software module 120 configured to receive status information, from the plurality of control devices, such as control devices 116, 118, for each of the multiple energy assets, such as energy assets 102, 104, for each of the nodes, such as nodes 106, 108, via the plurality of control devices, such as control devices 116, 118. Furthermore, software module 120 configured to construct a network topology for the distributed energy network 110 providing correlation between the multiple energy assets, such as energy assets 102, 104, based on the received status information. Furthermore, software module 120 configured to collect data, including forecast information, for each of the multiple energy assets, such as energy assets 102, 104, in the distributed energy network 110. Furthermore, software module 120 configured to formulate a constrained optimization problem based on the constructed network topology and the collected data. Furthermore, software module 120 configured to compute a solution to the formulated constrained optimization problem to determine one or more of settings, control commands and triggers for the associated energy asset, such as energy assets 102, 104, the plurality of control devices, such as control devices 116, 118, in the corresponding nodes, such as nodes 106, 108, to provide integration and optimization of the multiple energy assets, such as energy assets 102, 104, in the distributed energy network 110. Furthermore, software module 120 configured to determine unified control loops, indicative of real-time, dynamic operating characteristics of the distributed energy network 110 for the multiple energy assets such as energy assets 102, 104, to be executed by the single centralised control unit 122 and the plurality of control devices such as control devices 116, 118 therein.

Figure 2:
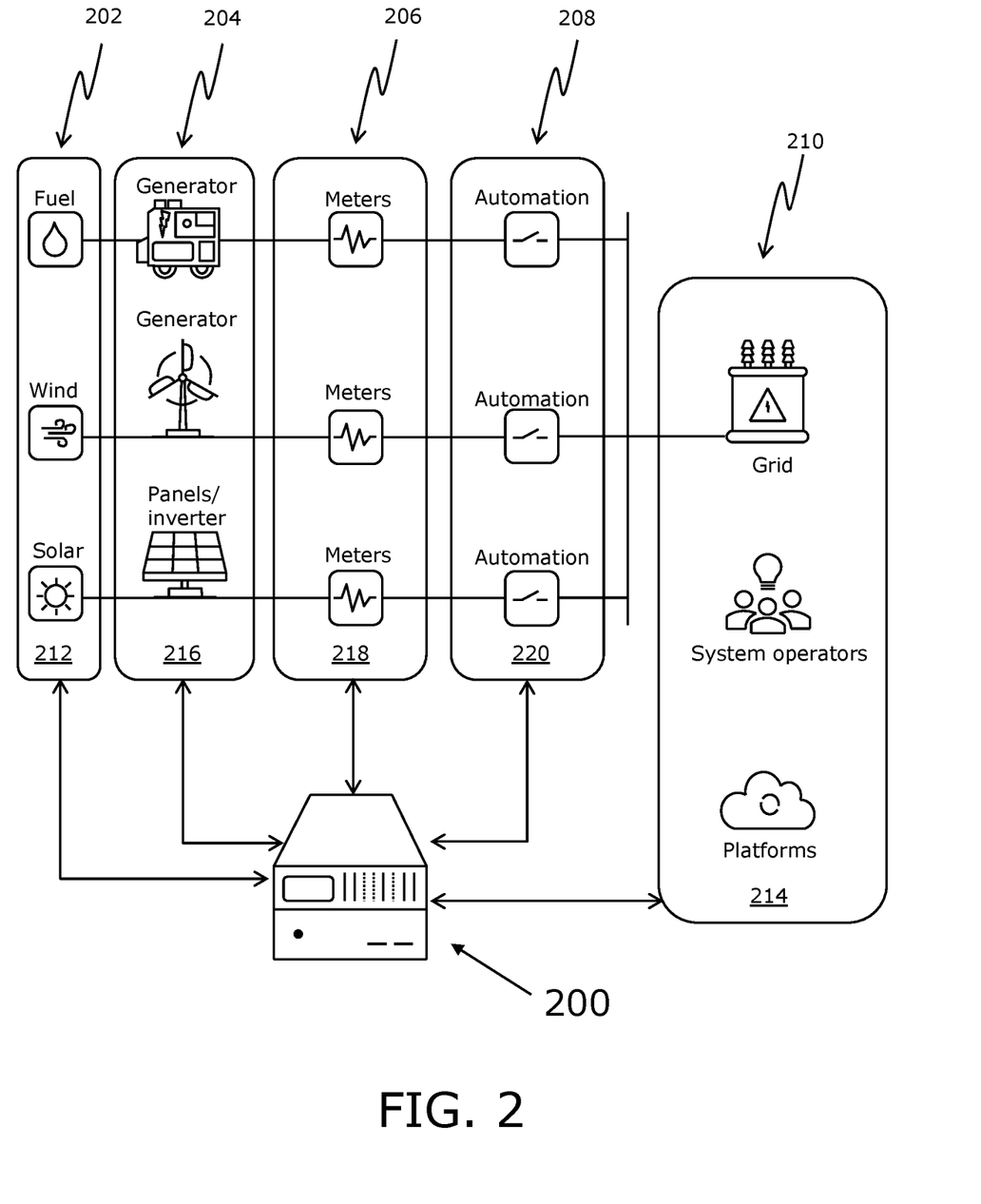
FIG. 2 is a schematic illustration of control device and associated layers thereof.

Referring to FIG. 2, illustrated is a schematic illustration of a control device 200 and associated layers, such as a resource management layer 202, a power conversion layer 204, a metering layer 206, a protection and automation layer 208 and an integration and operation layer 210, thereof, in accordance with an embodiment of the present disclosure. The control device 200 (similar to the control devices 116, 118 of FIG. 1) includes hardware elements and associated software with data processing, communication and energy system control functionalities. The software algorithms embedded within the control device 200 perform supervisory monitoring, dynamic control, protection, data analysis and optimisation of energy assets, similar to energy assets 102, 104 of FIG. 1, installed in distributed energy networks, similar to distributed energy network 110 of FIG. 1, in a coordinated and unified manner. The hardware elements and software architecture of the control device 200 follows a unique layered approach. Each layer, such as layers 202, 204, 206, 208 and 210, is associated with different hardware elements, functions and timeframes. As illustrated, the resource management layer 202 enables monitoring the energy sources 212, for example, fuel, wind, solar power, and so on, prior to any energy conversion and delivery to main energy system or subsystem 214, for example a grid. Moreover, the power conversion layer 204 enables real-time control and supervision of generation units 216 and associated supporting equipment and loads. Furthermore, the metering layer 206 enables real-time monitoring and control of metering equipment 218, for example power meters, smart meters, and so on. Furthermore, the protection and automation layer 208 enables real-time monitoring and control of automation and protection equipment 220, for example relays, circuit breakers, switches, and so on. Furthermore, the integration and operation layer 210 enables optimised operation of the distributed energy network and the realisation of the services and control characteristics with other subsystems 214 and/or interaction with operators thereof. The integration and operation layer 210 further enables data exchange with main energy system or subsystem 214. Herein, the layers, such as layers 202, 204, 206, 208 and 210, are not dependent on each other even though information can be exchanged for better performance of the control device 200. Furthermore, the control device 200 communicates with other subsystems, such as for example, system operators, trading systems, grid, and so on, for data acquisition, visualisation, multi-protocol interface for exchanging messages across various devices and platforms, internal/distributed communications and I/O cards for real-time signal exchange.

Figure 3:
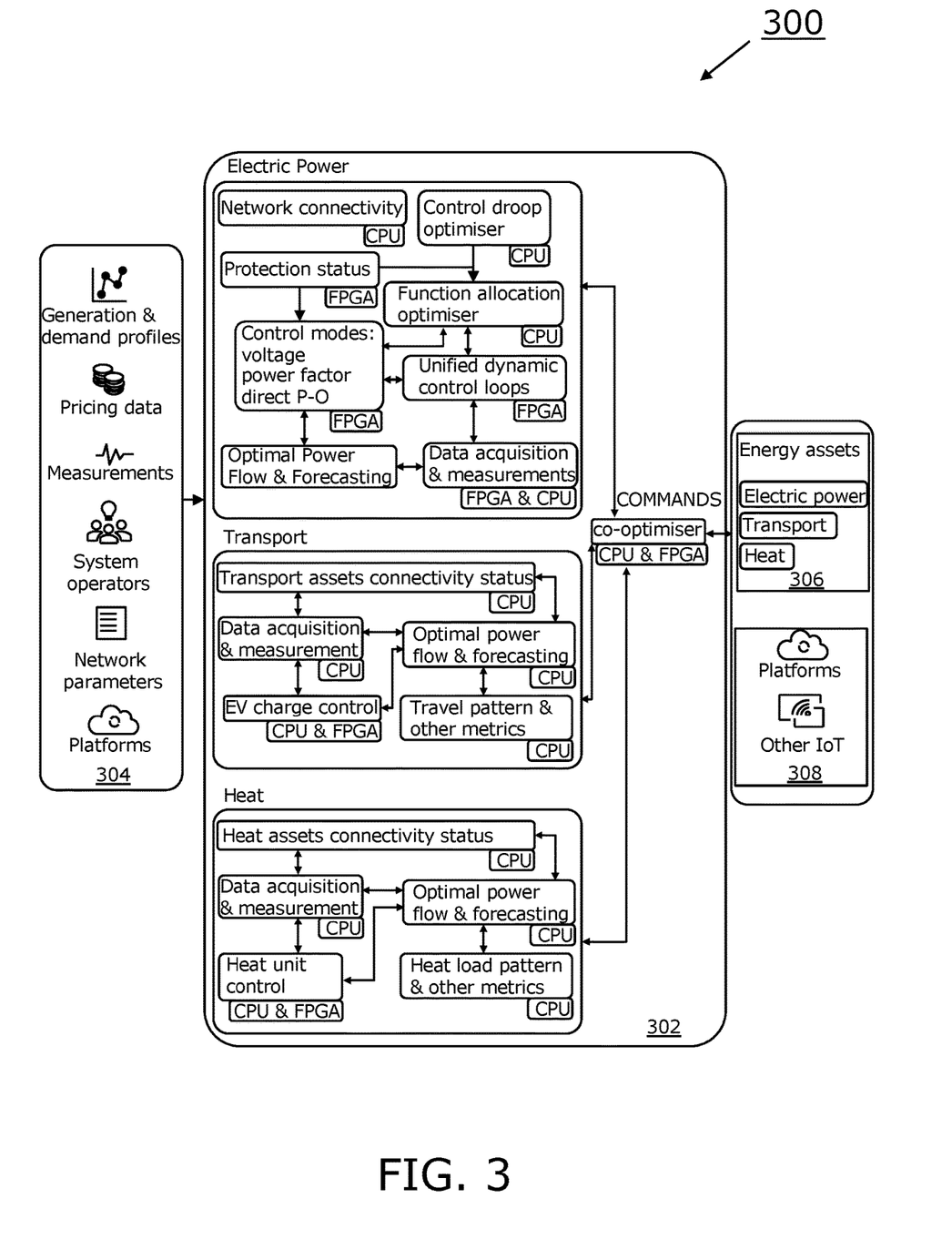
FIG. 3 is an exemplary implementation of a control process within the system of FIG. 1.

Referring to FIG. 3, illustrated is an exemplary implementation of a control process within a system 300 (similar to the system 100 of FIG. 1), in accordance with an embodiment of the present disclosure. As shown, the control device 302 accepts various input data, for example measurements, generation and consumption profiles, pricing, and so on, and implements multi-objective optimisation and real-time control processes, from external subsystems 304 or operators thereof, in order to optimize the multiple energy assets 306, for example electric power, transport and heat. Additionally, further data and commands are sent to other subsystems 308, for example energy platforms and IoT assets. For the realisation and real-time execution of the processes, depending on the criticality, data is shared and tasks are allocated between hardware elements, i.e. powerful multi-core processors (CPU), FPGA-based backbones, and distributed input-output devices and microcontrollers outside the SNC, such as subsystems 304, 308.

Figure 4:
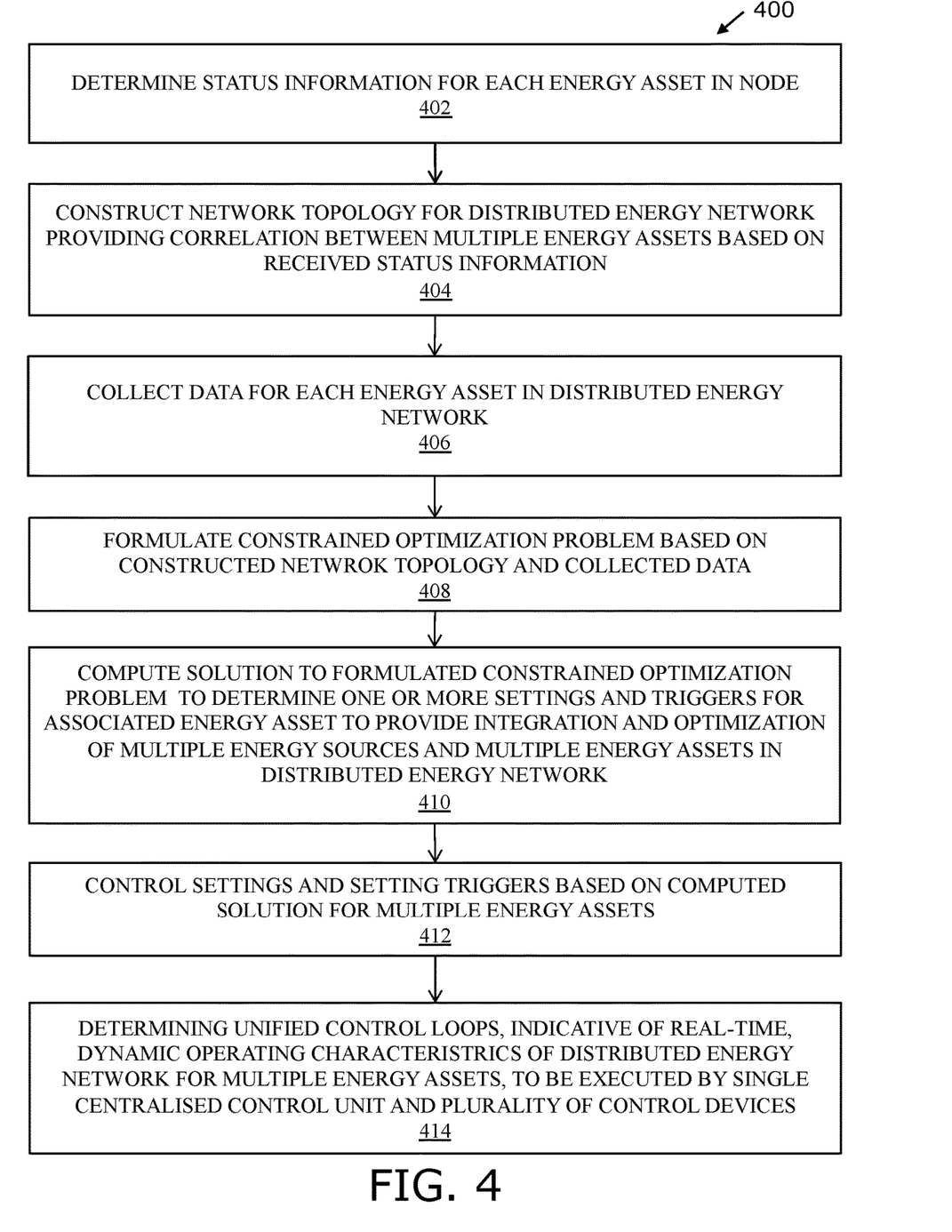
FIG. 4 is a flowchart listing steps of a method for continuous optimization and real-time control of multiple energy assets utilized by a plurality of nodes in a distributed energy network having different energy sources.

Referring to FIG. 4, illustrated is a flowchart 400 listing steps of a method for continuous optimization and real-time control of multiple energy assets utilized by a plurality of nodes in a distributed energy network having different energy sources, in accordance with an embodiment of the present disclosure. At step 402, a status information is determined for each of the multiple energy assets for each of the nodes. At step 404, a network topology is constructed for the distributed energy network providing correlation between the multiple energy assets based on the received status information. At step 406, data, including forecast information, is collected for each of the multiple energy assets in the distributed energy network. At step 408, a constrained optimization problem is formulated based on the constructed network topology and the collected data. At step 410, a solution to the formulated constrained optimization problem is computed to determine one or more of settings, control commands and triggers for the associated energy asset, for the plurality of control devices, in the corresponding node to provide integration and optimization of the multiple energy sources in the distributed energy network. At step 412, settings and setting triggers are controlled based on the computed solution, for the multiple energy assets. At step 414, unified control loops are determined which are indicative of real-time, dynamic operating characteristics of the distributed energy network for the multiple energy assets, to be executed by the single centralised control unit and the plurality of control devices therein.

The steps 402, 404, 406, 408, 410 412, and 414 are only illustrative and other alternatives can also be provided where one or more steps are added, one or more steps are removed, or one or more steps are provided in a different sequence without departing from the scope of the claims herein.

Figure 5A:
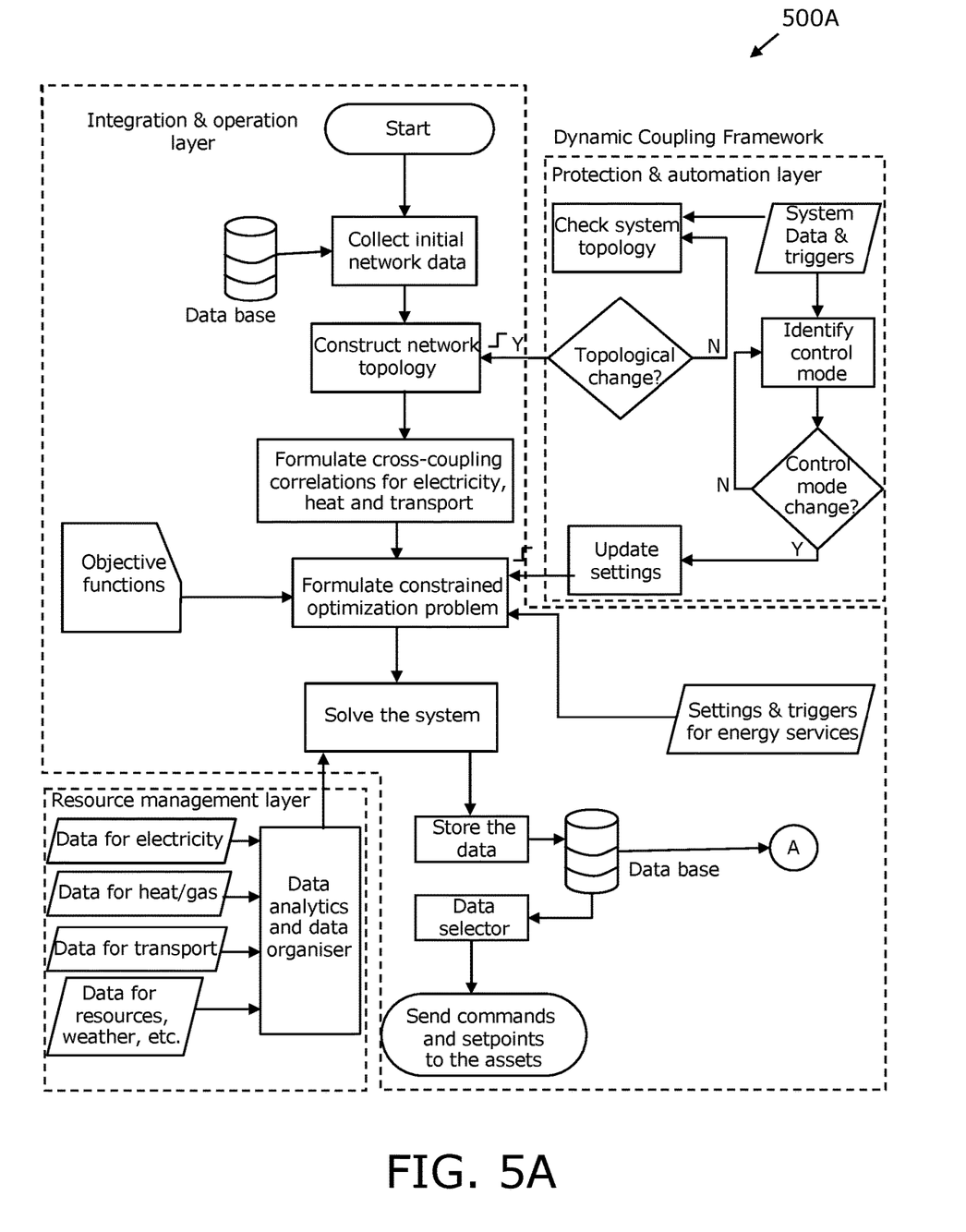
FIGS. 5A-5B are flowcharts depicting process flow in various layers for implementation of a multi-vector continuous optimization and control algorithms for optimization and real-time coordinated control of multiple energy assets in the system of FIG. 1.
Figure 5B:
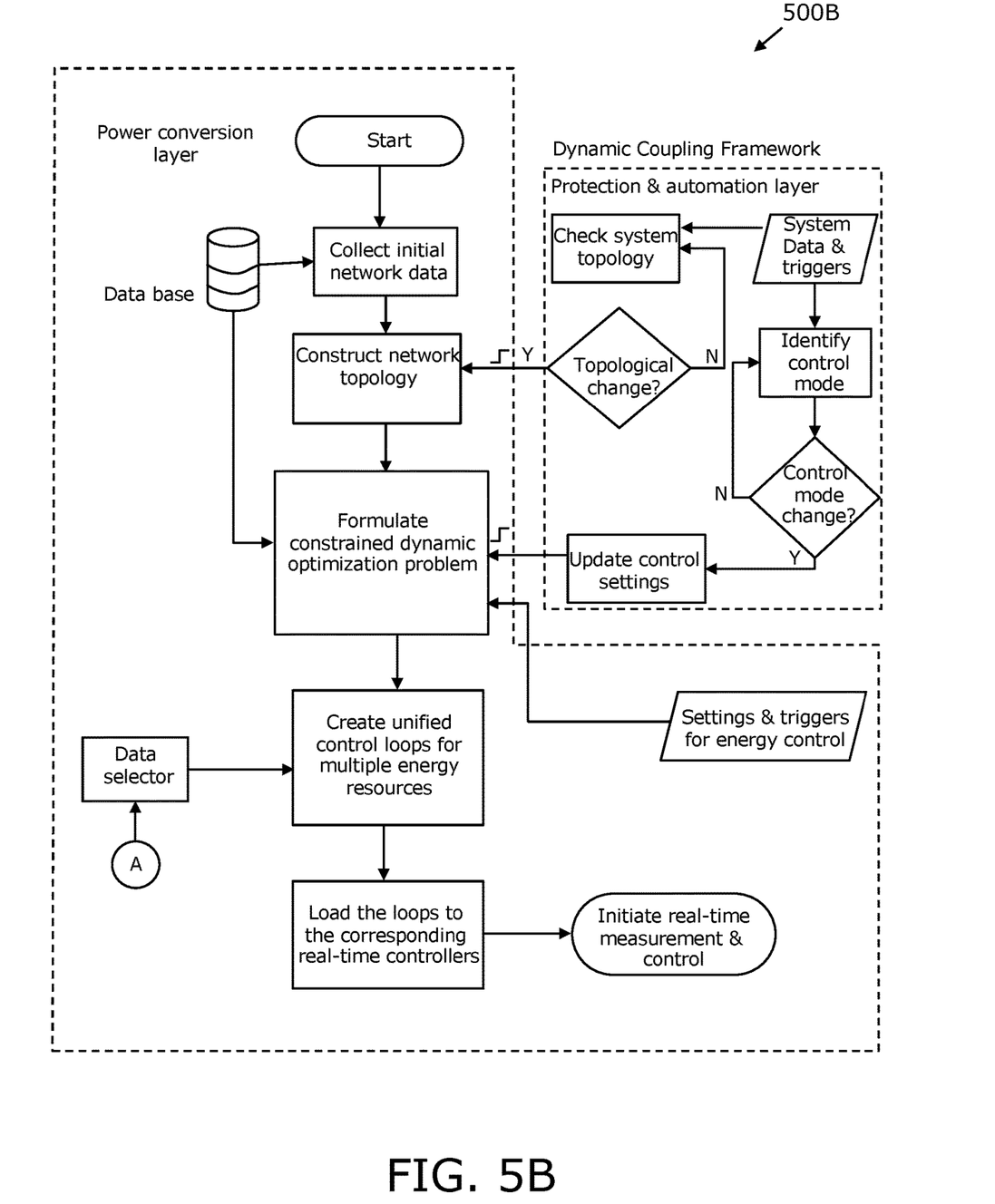

Referring to FIGS. 5A-5B, illustrated are flowcharts 500A-500B depicting process flow in various layers for optimization of multiple energy assets in a system (for example, the system 100 of FIG. 1), in accordance with an embodiment of the present disclosure. The various layers provide implementation of the multi-vector continuous optimization algorithm as described above. As shown in the flowchart 500A of FIG. 5A, in the dynamic coupling framework or module, the algorithm starts by checking that all required data and processes are ready to be utilized. Initial data corresponding to network and assets (e.g. connected and disconnected assets, availability, parameters, and the like) are collected from the relevant database. Subsequently, based on the collected data, a model of the network is constructed, in the form of a scripting language. The model includes all relevant details which are going to affect the steady-state operation of the energy network, such as, transmission lines, capacity of the assets, availability of the resources, and so on. Moreover, based on the constructed network topology, all three energy vectors (i.e. electric power, heat and transport) are coupled together via advanced correlation expressions, ultimately forming a unified energy system, where all the important variables are linked together. Furthermore, a set of functions indicating how much each variable contributes to the value to be optimized in the problem are determined. All the data (i.e. settings, triggers, grid code requirements, and so forth) relating to energy services (e.g. load shifting) are collected within the module. The data can be either static (e.g. a grid code requirement, a setting based on an energy service contract, and so on) or dynamic (e.g. a request for a scheduled energy provision), emanating from a real-time energy trading platform. Subsequently, constrained optimization problems are formulated in the form of a scripting language accounting for three energy vectors. Moreover, for the formulated constrained optimization problem, a function or a set of functions is to be minimized or maximized subject to certain constraints. The module performs advanced data analytics (e.g. forecasting) and organizes all required data (e.g. data profiles, weather data, and so on) and concentrates them in the correct format, timeframes and resolution. Consequently, the system is solved to find the optimal solutions as per the selected objective functions. Moreover, data from the constrained optimization problem formulation as well as the solutions are stored to a database. Furthermore, resource-specific data is selected prior to sending over to the assets and commands such as i) turn on/off, ii) active and reactive power setpoints, iii) voltage setpoints, iv) energy, and so on are broadcasted to the assets. Beneficially, the dynamic coupling framework acts as a 'watchdog' to monitor any change to the network and the assets with respect to topological changes (e.g. line connection/disconnection), changes to the control settings of the assets, and so on. Therefore, any change will initiate the re-formulation of the problem and hence will contribute to the extensive and adaptive optimization of the system as a whole. Moreover, as shown in the flowchart 500B of FIG. 5B, a power conversion layer provides the functionality of the integration and operation layer (as discussed above) by implementing objective functions related to the dynamic, real-time nature of energy systems. The algorithm starts by checking that all the required data, hardware and processes are ready to be utilized. Beneficially, self-diagnostics are performed prior to any process. Initial data corresponding to network and assets (e.g., connected and disconnected assets, availability, parameters, etc.) are collected from relevant data bases. Subsequently, based on the collected data, a model of the network is constructed in the form of a scripting language wherein the model includes all the relevant details which are going to affect the dynamic performance of the energy network, such as, control modes, time constants, dynamic response characteristics, transmission lines, capacity of the assets, etc. Further, all the data (i.e., settings, triggers, grid code requirements, etc.) related to fine, real-time control of the assets are collected within this module. Moreover, the data can be either static (e.g., a grid code requirement, a setting based on an energy service contract, etc.) or dynamic, emanating from third-parties such a request from a system operator, etc. Subsequently, based on the constructed network model, all three energy vectors (i.e. electric power, heat and transport) are coupled together via advanced dynamic correlation expressions, representing the real-time, dynamic operating characteristics of a unified energy system. Thereafter, unified control loops (representing the real-time, dynamic operating characteristics of the energy system as a whole) are created in form of scripting language. The unified control loops include i) fundamental building blocks consisting of all the physical components and control functions necessary to automatically adjust the value of measured process variables to equal the value of desired set-points, ii) corresponding settings (i.e., gains, time constants, droop characteristics, etc.) and iii) functions to implement smooth control mode transition and error handling. The unified control loops and associated control settings are loaded to the corresponding real-time controllers (either locally or remotely). Thereafter, the unified control loops are initiated by collecting real-time measurements and producing the corresponding control actions for the assets. Beneficially, framework acts as a 'watchdog', to monitor any change to the network and the assets with respect to topological changes (e.g., line connection/disconnection), changes to the control settings of the assets, and so forth. Therefore, any change will initiate the re-creation of control loops and hence contribute to the continuous, adaptive and real-time controllability of the system as a whole.

Beneficially, the dynamic coupling framework creates a dynamic optimisation as it allows for updates depending on the network structure, topology, and so forth. Beneficially, on a real-time basis and based on event occurrence, the dynamic coupling framework updates the network topology and identifies relevant control modes of operation for all energy assets involved in the network towards updating their control settings prior to solving the optimisation problem in an optimal manner. Beneficially, the introduction of the dynamic coupling framework allows the network to be operated under the most optimal settings at all times with changes in the control modes as necessary to best serve the network's needs. Beneficially, the dynamic coupling framework, considers relevant settings of the assets which are set for critical times in energy systems. For example, certain generators might have a certain 'headroom' (i.e. a safety margin if you will) to allow for frequency control in critical times.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for continuous optimization and real-time control of multiple energy assets utilized by a plurality of nodes in a distributed energy network having different energy sources, wherein the multiple energy assets comprise electric power, heat and transport, the system comprising:
   a plurality of control devices, with each of the plurality of control devices associated with one of the multiple energy assets in one of the plurality of nodes, each of the plurality of control devices is configured to determine and communicate a status information of the associated energy asset in the corresponding node, and to control settings and set triggers for the associated energy asset for regulating utilization thereof by the corresponding node; and
   a software module configured to:
      receive status information, from the plurality of control devices, for each of the multiple energy assets for each of the nodes via the plurality of control devices;
      construct a network topology for the distributed energy network providing correlation between the multiple energy assets based on the received status information;
      collect data, including forecast information, for each of the multiple energy assets in the distributed energy network;
      formulate a constrained optimization problem based on the constructed network topology and the collected data;
      compute a solution to the formulated constrained optimization problem to determine one or more of settings, control commands and triggers for the associated energy asset, for the plurality of control devices, in the corresponding node to provide integration and optimization of the multiple energy sources and multiple energy assets in the distributed energy network; and
      determine unified control loops, indicative of real-time, dynamic operating characteristics of the distributed energy network for the multiple energy assets, to be executed by the plurality of control devices therein.

2. The system of claim 1, wherein the software module is further configured to:
   monitor changes in the network topology; and
   re-formulate the constrained optimization problem based on changes in the network topology and the multiple energy assets.

3. The system of claim 1, wherein the software module is further configured to determine a set of functions indicative of contribution of each variable related to the multiple energy assets in the constrained optimization problem.

4. The system of claim 1, wherein the collected data comprises one or more of weather information, information about limitations of the distributed energy network, information about limitations of energy provider, historical information about generation and consumption of each of the energy asset by each of the node, historical pricing information.

5. The system of claim 1, wherein the software module is further configured to exchange status information related to the multiple energy assets to energy platforms associated with the distributed energy network, and wherein the energy platforms comprise one or more of energy operator's platform, energy trading platform and energy exchange platform.

6. The system of claim 1, wherein the software module is implemented in a central server, with each of the plurality of control devices being a Field Programmable Gate Array (FPGA) based control device and/or a Central Processing Unit (CPU).

7. The system of claim 1, wherein the software module is implemented in the one or more of the plurality of control devices in the distributed energy network.

8. A method for continuous optimization and real-time control of multiple energy assets utilized by a plurality of nodes in a distributed energy network having different energy sources, wherein the multiple energy assets comprise electric power, heat and transport, the method comprising:
   determining a status information for each of the multiple energy assets for each of the nodes; and
   constructing a network topology for the distributed energy network providing correlation between the multiple energy assets based on the received status information;
   collecting data, including forecast information, for each of the multiple energy assets in the distributed energy network;
   formulating a constrained optimization problem based on the constructed network topology and the collected data;
   computing a solution to the formulated constrained optimization problem to determine one or more of settings, control commands and triggers for the associated energy asset, for the plurality of control devices, in the corresponding node to provide integration and optimization of the multiple energy sources and multiple energy assets in the distributed energy network;
   controlling settings and setting triggers, based on the computed solution, for the multiple energy assets; and
   determining unified control loops, indicative of real-time, dynamic operating characteristics of the distributed energy network for the multiple energy assets, to be executed by the plurality of control devices therein.

9. The method of claim 8 further comprising:
   monitoring changes in the network topology; and
   re-formulating the constrained optimization problem based on changes in the network topology.

10. The method of claim 8 further comprising determining a set of functions indicative of contribution of each variable related to the multiple energy assets in the constrained optimization problem.

11. The method of claim 8, wherein the collected data comprise one or more of weather information, information about limitations of the distributed energy network, information about limitations of energy provider, historical information about generation and consumption of each of the energy asset by each of the node, historical pricing information.

12. The method of claim 8 further comprising exchanging status information related to the multiple energy assets to energy platforms associated with the distributed energy network, and wherein the energy platforms comprise one or more of energy operator's platform, energy trading platform and energy exchange platform.

\* \* \* \* \*